(12) United States Patent
Ott

(10) Patent No.: US 6,356,610 B1
(45) Date of Patent: Mar. 12, 2002

(54) SYSTEM TO AVOID UNSTABLE DATA TRANSFER BETWEEN DIGITAL SYSTEMS

(75) Inventor: Stefan Ott, Munich (DE)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/103,642

(22) Filed: Jun. 23, 1998

(51) Int. Cl.[7] ............... H04L 7/00; H04L 25/36; H04L 25/40
(52) U.S. Cl. ............ 375/371; 375/373; 327/149; 327/150
(58) Field of Search ................. 375/371, 373, 375/374, 375, 376, 378; 327/149, 150

(56) References Cited

U.S. PATENT DOCUMENTS

| | | | | |
|---|---|---|---|---|
| 6,011,822 A | * | 1/2000 | Dreyer | 375/376 |
| 5,910,741 A | * | 6/2000 | Watanabe | 327/150 |
| 6,154,071 A | * | 11/2000 | Nogawa | 327/156 |

* cited by examiner

*Primary Examiner*—Mohammad H. Ghayour
(74) *Attorney, Agent, or Firm*—Wagner, Murabito & Hao LLP

(57) ABSTRACT

A system to avoid unstable data transfer between digital systems. The present invention includes a system that enables digital systems to communicate while avoiding unstable data transfer, which can result in a loss of data or signal distortion. For instance, the present invention includes a system that enables detection of potentially unstable operating conditions for a digital receiver device during its reception of clock and digital data signals from a digital transmitter device. One embodiment of the present invention monitors the received clock and digital data signals in order to detect any potential violations of the internal input timing requirement of the digital receiver device. If any potential violations of the input timing requirement are detected, the present invention invokes measures to eliminate them by manipulating the phase of the clock signal utilized internally by the digital receiver device to sample the received digital data signals. In this manner, the present invention ensures that the digital receiver device internally operates within its input timing requirement and thereby avoids unstable operating conditions which can result in signal distortion or a loss of data. Therefore, the present invention enables digital systems to communicate while avoiding unstable data transfer.

26 Claims, 17 Drawing Sheets

SYSTEM TO AVOID UNSTABLE DATA TRANSFER BETWEEN DIGITAL SYSTEMS

TECHNICAL FIELD

The present invention relates to the field of communication. More specifically, the present invention relates to digital communication between digital systems.

BACKGROUND ART

There are many different electronic devices available to the general public which offer a wide variety of useful functions to their operators. Many of these electronic devices internally operate utilizing digital technology as opposed to analog technology. For example, computers, calculators, telephones, cameras, personal digital assistants (PDAs), televisions, and the like, can all internally operate utilizing digital technology. Electronic devices which utilize digital technology are sometimes referred to as digital systems. Furthermore, the digital subcomponents located within digital electronic devices are also referred to as digital systems.

Transmission of digital data between digital systems has become an essential element of commonly used systems. FIG. 1 is a block diagram of a typical prior art digital transmission and reception system 100. Within system 100, digital transmitter device 102 transmits a digital data signal 106 accompanied by a clock signal 108 to digital receiver device 104. The reason for transmitting clock signal 108 along with digital data signal 106 is to ensure stable data sampling by digital receiver device 104. Digital receiver device 104 utilizes a data register circuit 112 to receive digital data signal 106 while utilizing a clock generator circuit 110 to receive clock signal 108. In order for data register circuit 112 to operate properly while receiving digital data signal 106, its input timing requirement needs to be satisfied. As such, the main function of clock generator circuit 110 is to derive a clock signal 114 from clock signal 108 in such a way that the input timing requirement of data register circuit 112 is satisfied. The input timing requirement of data register circuit 112 is described in more detail below with reference to FIGS. 2A and 2B.

FIG. 2A is a block diagram of data register circuit 112 of FIG. 1, which is implemented as a clocked D flip-flop circuit. In order to understand the timing requirement of data register circuit 112, it is important to first understand its basic operations. The main function of data register circuit 112 is to output the same signal value that it receives as an input signal value. But this does not occur until data register circuit 112 receives a clock signal that transitions from one voltage level to another (e.g., from 0 to 1 volt). For example, assume that input 202 of data register circuit 112 is equal to the value of 1. Upon receiving a clock signal transition 206, data register circuit 112 causes output 204 to be equal to the value of 1.

In order for data register circuit 112 of FIG. 2A to function properly, there is a timing requirement that typically needs to be satisfied. FIG. 2B is a timing diagram illustrating the timing requirement of data register circuit 112 of FIG. 2A. The internal circuitry of data register circuit 112 ordinarily necessitates that the data value at input 202 remain stable and unchanged during a set-up time 220 and a hold time 222 of an active clock transition 206, which are collectively referred to as a stability window 226. When the timing condition is satisfied, the data value at output 204 reflects the data value of input 202 during clock transition 206, as indicated by section 228. It should be appreciated that once clock transition 206 is received by data register circuit 112, there is a propagation delay 224 that occurs before the data value at output 204 reflects the data value of input 202.

There is a disadvantage associated with data register circuit 112 as described above with reference to FIGS. 1, 2A, and 2B. The disadvantage occurs when the timing requirement of data register circuit 112 is violated and clock generator circuit 110 of FIG. 1 is unable to rectify the situation. FIG. 2C is a timing diagram illustrating a violation of the timing requirement of data register circuit 112, which causes unstable data transfer and can result in a loss of data or signal distortion. As previously stated, the internal circuitry of data register circuit 112 typically necessitates that the data value at input 202 remain stable and unchanged during stability window 226. As shown in FIG. 2C, the data value at input 202 does not remain stable during stability window 226. Instead, a data transition 250 occurs at input 202 during hold time 222, thereby violating the timing requirement of data register circuit 112. When the timing requirement is violated, the data value at output 204 becomes unpredictable, as indicated by section 252. In other words, the data value at output 204 could be equal to the value of one or to the value of zero, but there is no way of determining which data value. Furthermore, the violated timing requirement of data register circuit 112 could cause the data value of output 204 to exhibit the effect of metastability, meaning the data value is not equal to one or zero, but instead is some value in between zero and one. Semiconductor manufacturers have designed circuitry making the problem of metastability less significant, but within the prior art it is not totally avoidable.

Within the prior art, special circuits and technologies have been developed which improve the robustness of data register circuit 112 against such unstable operation by greatly narrowing stability window 226 and also improving its recovery properties even if stability window 226 is violated. This leads to an improvement in the reliability of digital receiver device 104 and a rare occurrence of timing violations of data register circuit 112. However, when timing violations of data register circuit 112 do occur, they are not detected and may lead to undesirable behavior or malfunction of the whole digital receiver device 104. Furthermore, there remains a certain residual risk of data corruption that may be unacceptable for high data rates or highly secure digital systems.

Thus, what is desired is a system which enables a digital transmitter device and a digital receiver device to communicate while avoiding unstable data transfer, which can result in a loss of data or signal distortion. The present invention provides this advantage.

DISCLOSURE OF THE INVENTION

The present invention includes a system that enables digital systems to communicate while avoiding unstable data transfer, which can result in a loss of data or signal distortion. For instance, the present invention includes a system that enables detection of potentially unstable operating conditions for a digital receiver device during its reception of clock and digital data signals from a digital transmitter device. One embodiment of the present invention monitors the received clock and digital data signals in order to detect any potential violations of the internal input timing requirement of the digital receiver device. If any potential violations of the input timing requirement are detected, the present invention invokes measures to eliminate them by manipulating the phase of the clock signal utilized internally by the digital receiver device to sample the received digital data signals. In this manner, the present invention ensures that the digital receiver device internally operates within its input timing requirement and thereby avoids unstable operating conditions which can result in signal distortion or a loss of data. Therefore, the present invention enables digital systems to communicate while avoiding unstable data transfer.

Specifically, one embodiment of the present invention is a system for avoiding unstable data transfer between digital devices, wherein the system includes a digital transmitter device and a digital receiver device. The digital transmitter device transmits a data signal and a first clock signal. The digital receiver device is coupled to receive the data signal and the first clock signal transmitted by the digital transmitter device. The digital receiver device includes a clock generator circuit that is coupled to receive the first clock signal and is also able to generate a second clock signal. Furthermore, the digital receiver device includes a clock monitor circuit that is coupled to receive the first clock signal and the second clock signal. The clock monitor circuit is able to detect a potential unstable operating condition for the digital receiver device. In response to detecting the potential unstable operating condition, the clock monitor circuit generates an adjust signal that is received by the clock generator circuit. The reception of the adjust signal causes the clock generator circuit to manipulate the phase of the second clock signal with respect to the phase of the first clock signal. In this manner, the clock generator circuit is able to remove the potentially unstable operating condition. Moreover, the digital receiver device includes internal circuitry which is coupled to receive the data signal and the second clock signal.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior art

Prior art

Prior art

Prior art

BEST MODE FOR CARRYING OUT THE INVENTION

In the following detailed description of the present invention, a system for avoiding unstable data transfer between digital systems, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention includes a system that enables digital systems to communicate while avoiding unstable data transfer, which can result in a loss of data or signal distortion. For instance, the present invention includes a system that enables detection of potentially unstable operating conditions for a digital receiver device during its reception of clock and digital data signals from a digital transmitter device. One embodiment of the present invention monitors the received clock and digital data signals in order to detect any potential violations of the internal input timing requirement of the digital receiver device. If any potential violations of the input timing requirement are detected, the present invention invokes measures to eliminate them by manipulating the phase of the clock signal utilized internally by the digital receiver device to sample the received digital data signals. In this manner, the present invention ensures that the digital receiver device internally operates within its input timing requirement and thereby avoids unstable operating conditions which can result in signal distortion or a loss of data. Therefore, the present invention enables digital systems to communicate while avoiding unstable data transfer.

Figure 1:
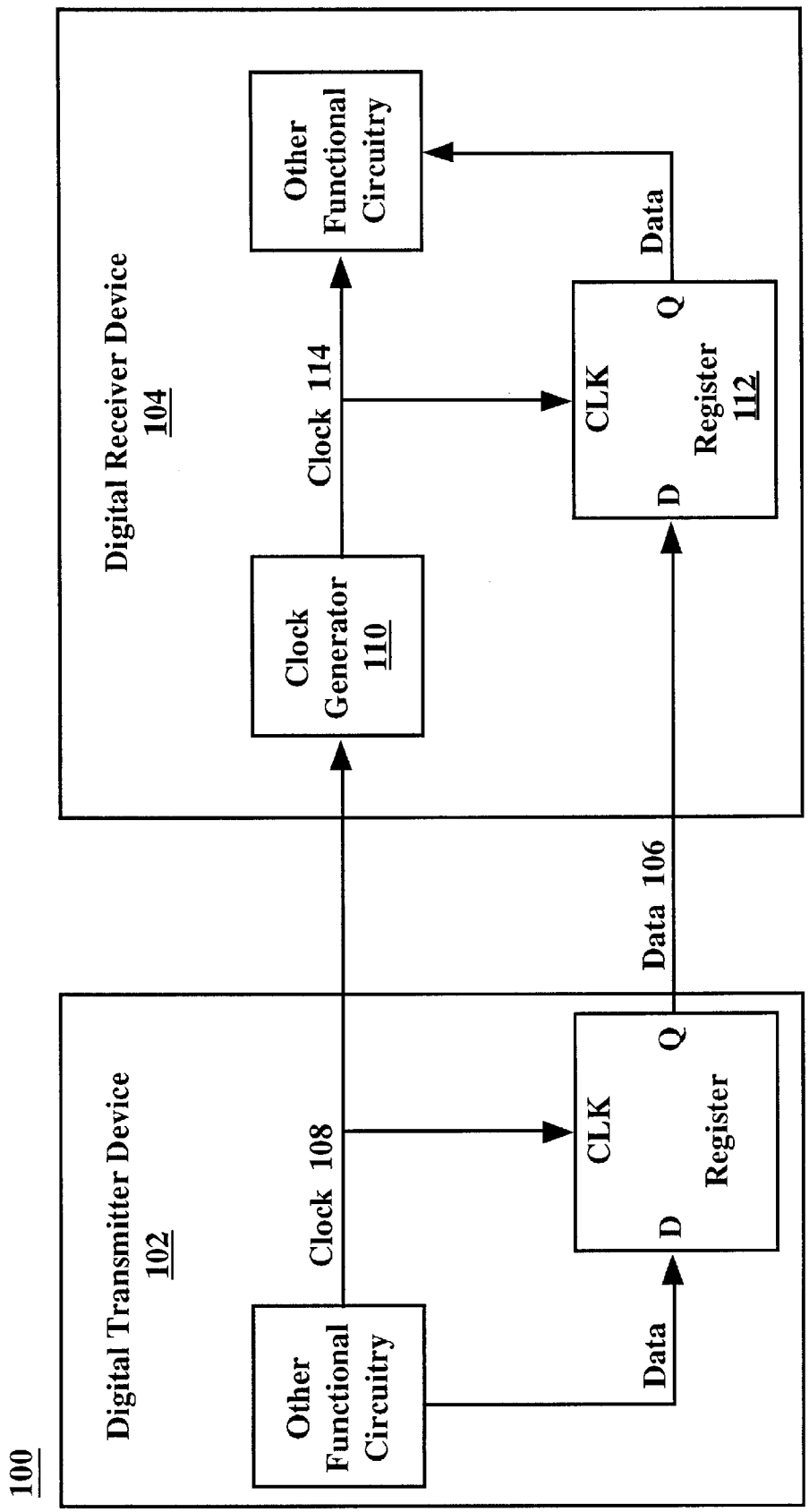
FIG. 1 is a block diagram of a typical prior art digital transmission and reception system.
Figure 2A:
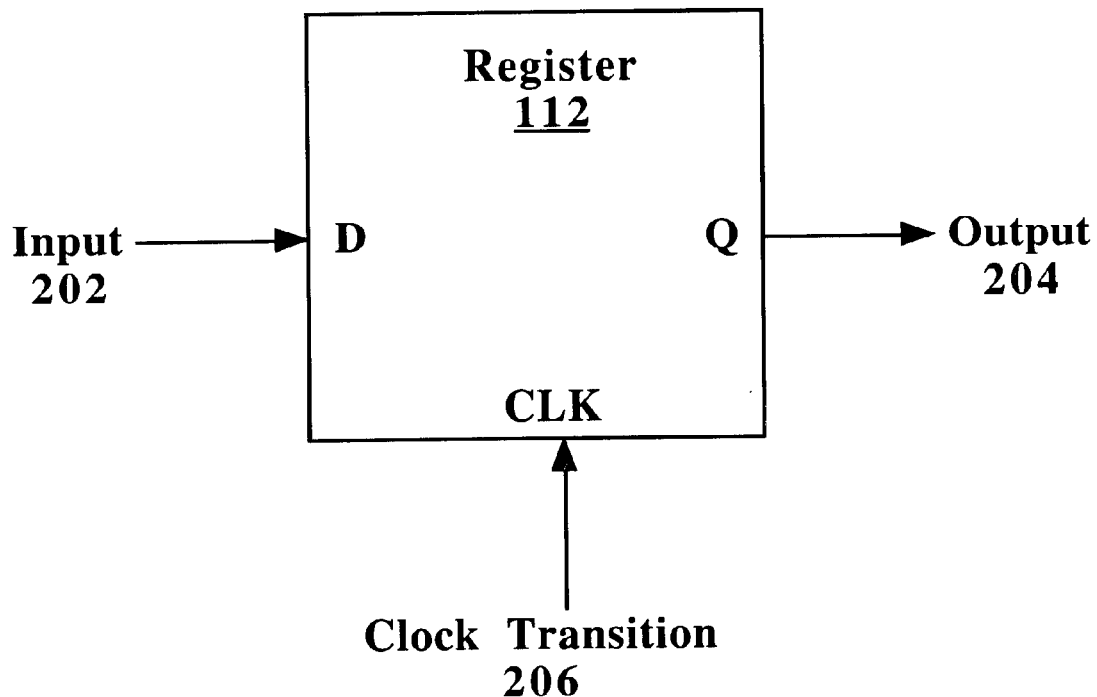
FIG. 2A is a block diagram of a data register circuit of prior art FIG. 1, which is implemented as a clocked D flip-flop circuit.
Figure 2B:
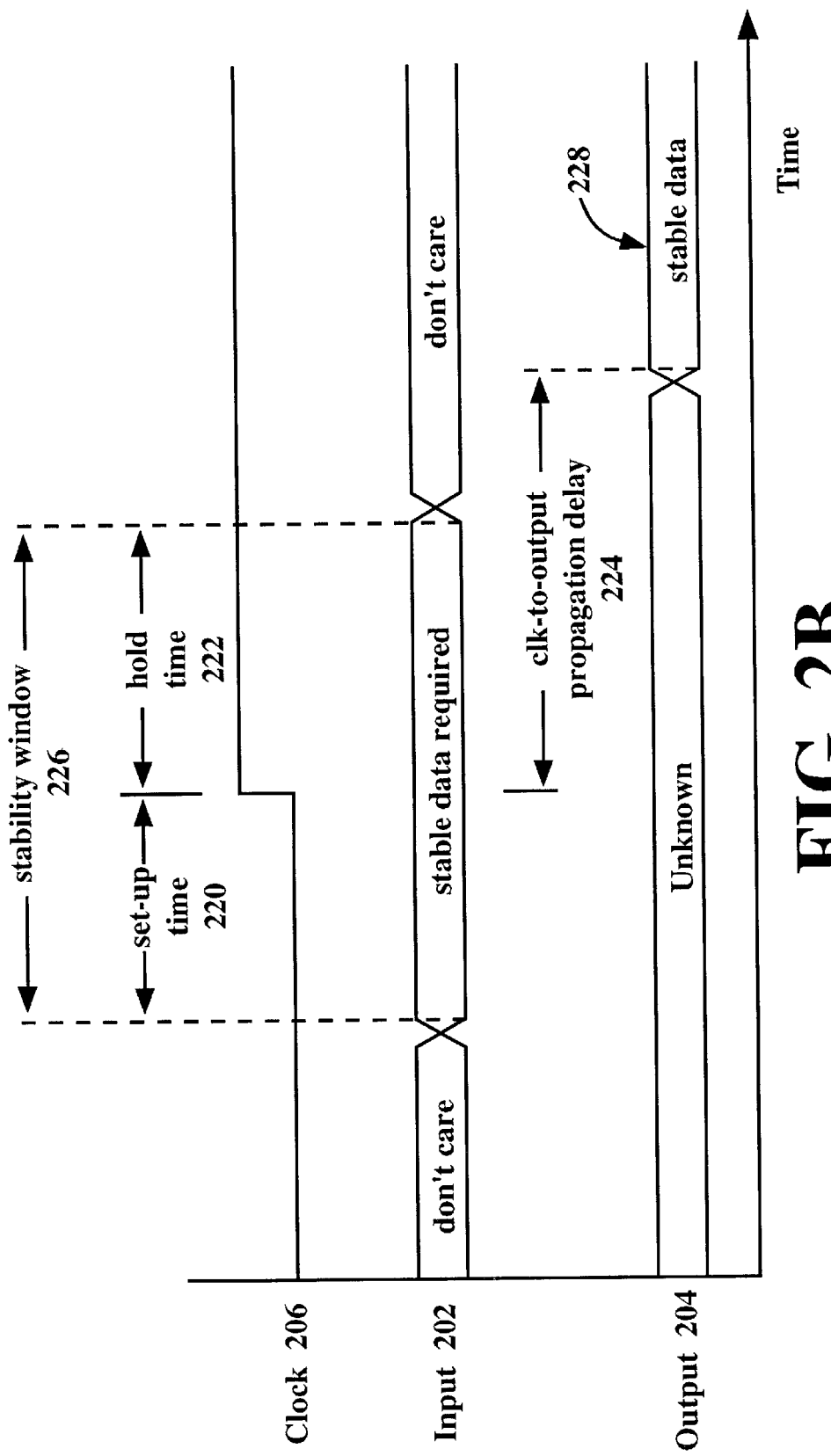
FIG. 2B is a timing diagram illustrating the timing requirement of the data register circuit of prior art FIG. 2A.
Figure 2C:
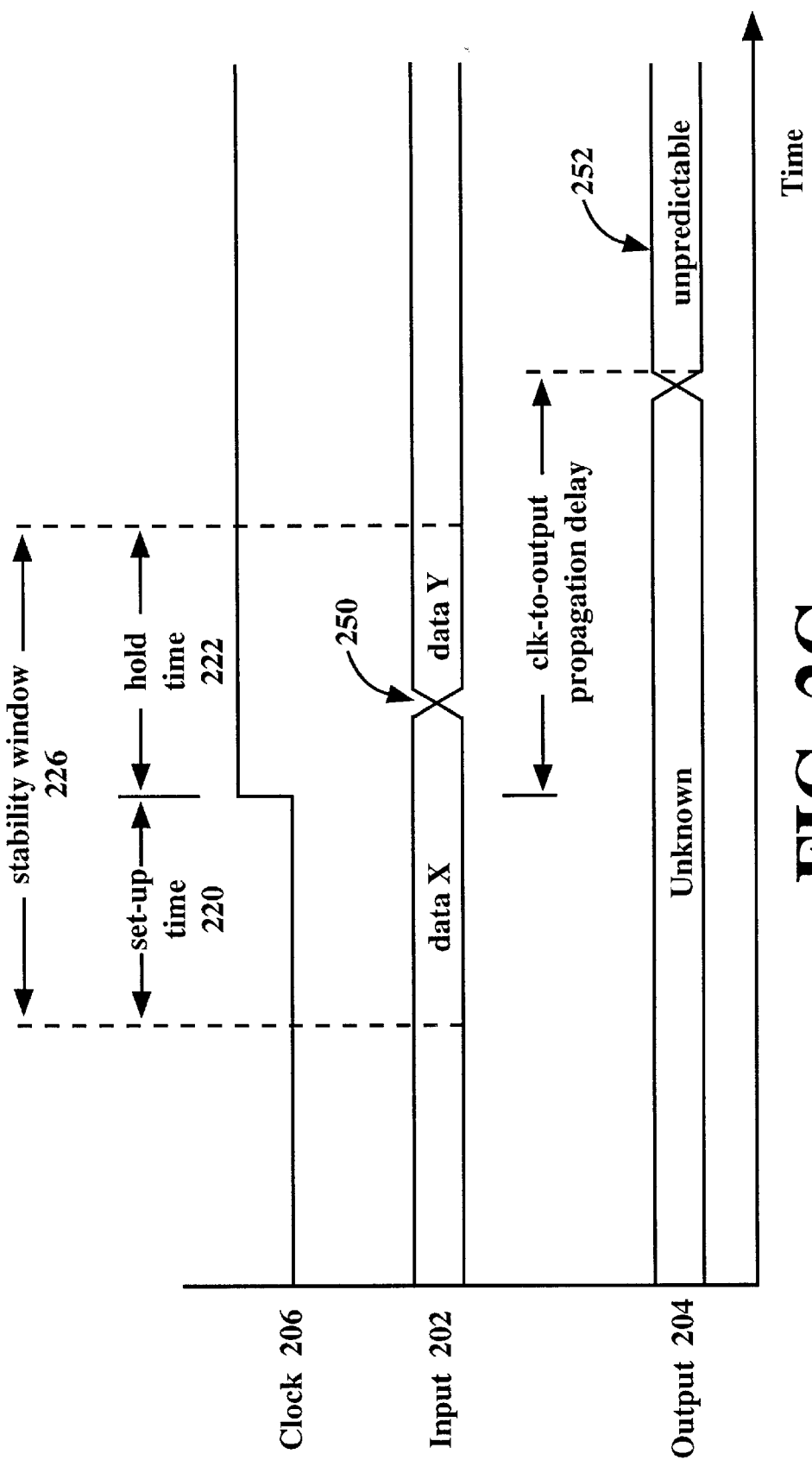
FIG. 2C is a timing diagram illustrating a violation of the timing requirement of the data register circuit of prior art FIG. 2A.
Figure 3A:
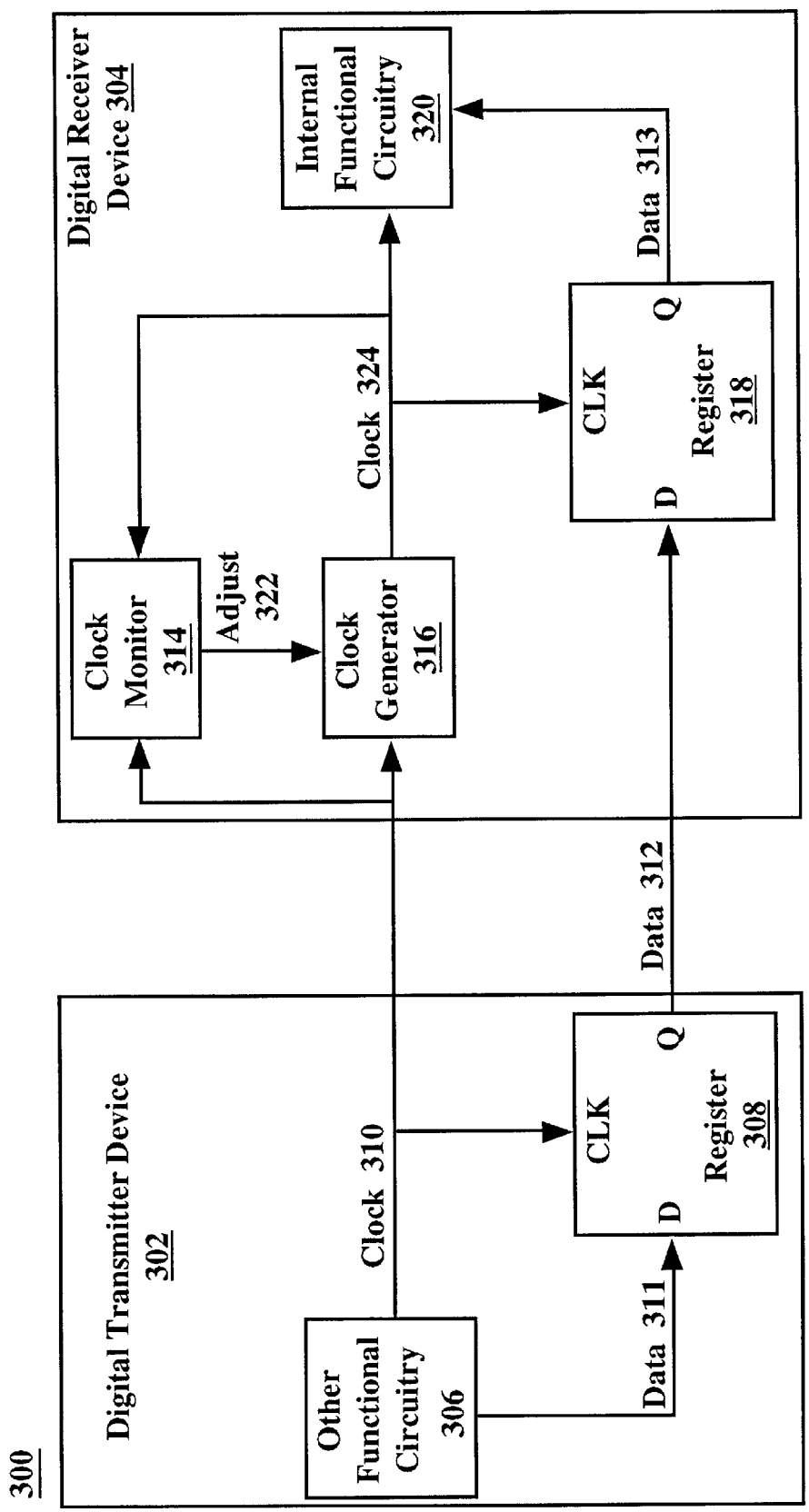
FIG. 3A is a block diagram of a digital transmission and reception system, which is one embodiment in accordance with the present invention for avoiding unstable data transfer.

FIG. 3A is a block diagram of a digital transmission and reception system 300, which is one embodiment in accordance with the present invention for avoiding unstable data transfer. Within system 300, a digital transmitter device 302 transmits a digital data signal 312 accompanied by a clock signal 310 to digital receiver device 304. The reason for transmitting clock signal 310 along with digital data signal 312 is to ensure stable data sampling by digital receiver device 304. It should be appreciated that digital transmitter device 302, in accordance with the present invention, includes any type of digital transmitter device utilized within the digital electrical arts. It should be further appreciated that digital receiver device 304, in accordance with the present invention, includes any type of digital receiver device utilized within the digital electrical arts. Moreover, it should be appreciated that digital transmitter device 302 and digital receiver device 304, in accordance with the present invention, can each be separate digital systems or can both be located within the same digital system (e.g., the same circuit board).

Within digital transmitter device 302 of FIG. 3A, clock signal 310 and digital data signal 311 are generated by internal functional circuitry 306. An output data register circuit 308 is coupled to receive clock signal 310 and digital data signal 311 from internal functional circuitry 306 in preparation for transmission of digital data signal 312. Both clock signal 310 and digital data signal 312 are then transmitted to digital receiver device 304. It should be appreciated that in accordance with the present invention, clock signal 310 and digital data signal 312 can be transmitted to digital receiver device 304 either separately over two interfaces (e.g., wires) or together over the same interface.

Digital receiver device 304 of FIG. 3A is coupled to receive clock signal 310 and digital data signal 312 from digital transmitter device 302 utilizing an input data register circuit 318, a clock generator circuit 316, and a clock monitor circuit 314. Specifically, clock generator circuit 316 and clock monitor circuit 314 are each coupled to receive clock signal 310 from digital transmitter device 302. Furthermore, input data register circuit 318 is coupled to receive digital data signal 312 from digital transmitter device 302. In order for input data register circuit 318 to operate properly while receiving digital data signal 312, its input timing requirement typically needs to be satisfied. As such, it is the combined functionality of clock monitor circuit 314 and clock generator circuit 316 to ensure that the timing requirement of input data register circuit 318 is satisfied, thereby enable digital receiver device 304 to avoid potentially unstable operating conditions.

Figure 3B:
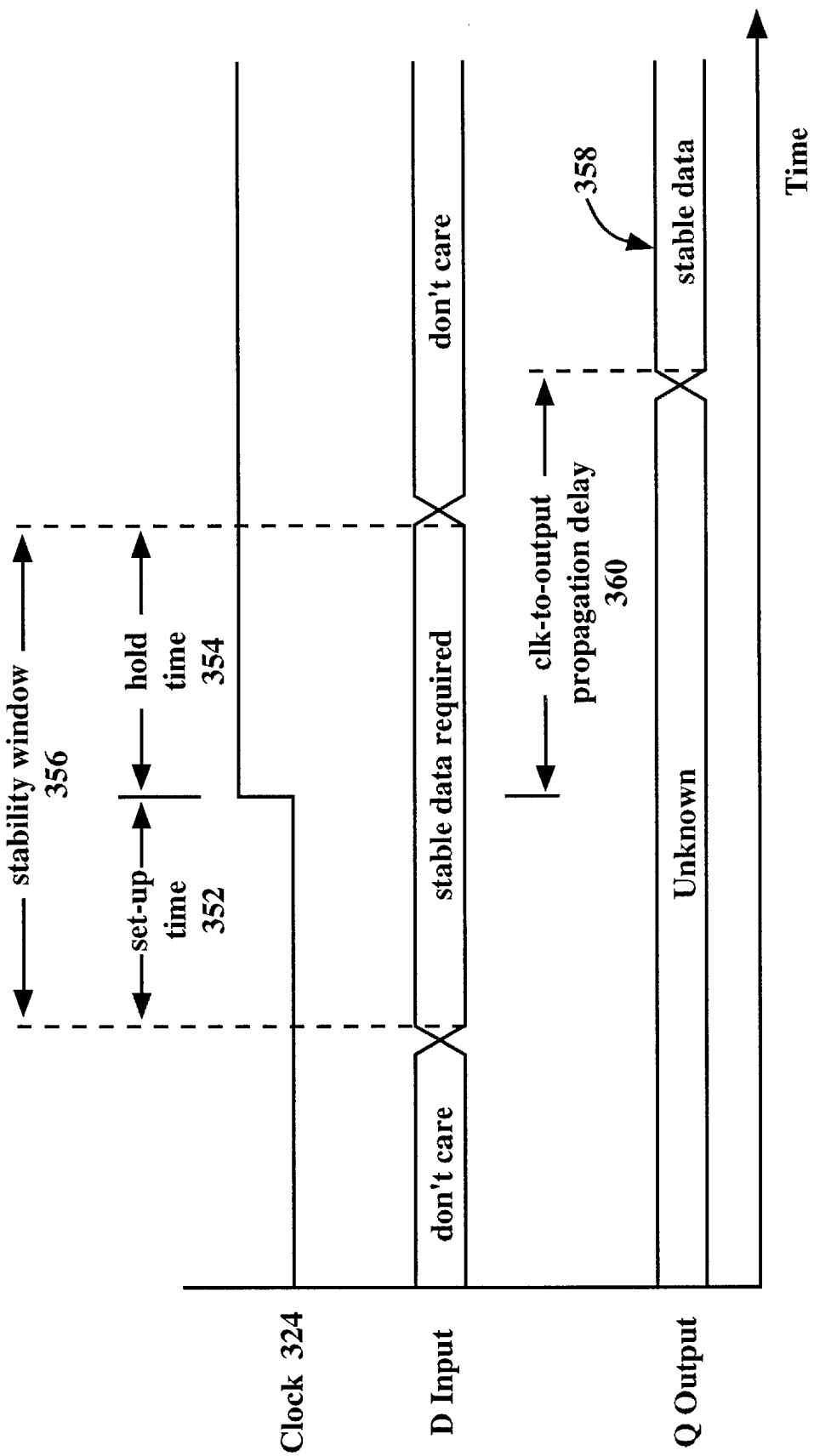
FIG. 3B is a timing diagram illustrating the input timing requirement of the input data register circuit of the digital receiver device of FIG. 3A.

FIG. 3B is a timing diagram illustrating the input timing requirement of input data register circuit 318 of digital receiver device 304 of FIG. 3A. The internal circuitry of input data register circuit 318 typically necessitates that the data value at its D input remain stable and unchanged during a set-up time 352 and a hold time 354 of an active clock transition within clock signal 324, which are collectively referred to as a stability window 356. When the timing condition is satisfied, the data value at the Q output of input data register circuit 318 reflects the data value of its D input during the clock transition within clock signal 324, as indicated by section 358. It should be appreciated that once the clock transition within clock signal 324 is received by input data register circuit 318, there is a propagation delay 360 that occurs before the data value at its Q output reflects the data value of its D input.

In order to ensure that the timing requirement of input data register circuit 318 of FIG. 3A is satisfied during its reception of digital data signal 312 and clock signal 324, clock monitor circuit 314 and clock generator circuit 316 operate in conjunction to achieve this objective. Specifically, clock generator circuit 316 derives a clock signal 324 from clock signal 310 in such a way that the input timing requirement of input data register circuit 318 is satisfied. But there are circumstances under which clock generator circuit 316 is unable to ensure that the input timing requirement of input data register circuit 318 is satisfied. As such, clock monitor circuit 314 is utilized to detect any potential input timing violations of input data register circuit 318 and initiate a process within clock generator circuit 316 to eliminate them.

Specifically, clock monitor circuit 314 of FIG. 3A monitors clock signal 310 received from digital transmitter device 302 and clock signal 324 output by clock generator circuit 316. Upon detecting any potential input timing violations of input data register circuit 318, clock monitor circuit 314 generates an adjust signal 322 which is received by clock generator circuit 316. The reception of adjust signal 322 causes clock generator circuit 316 to shift the phase of clock signal 324 forward or backward with respect to clock signal 310 in order to eliminate any detected potential timing violations. Within one embodiment of clock generator circuit 316, in accordance with the present invention, the phase of clock signal 324 is shifted by temporarily increasing or decreasing the clock frequency of clock signal 324. Thus, any potential timing violations of input data register circuit 318 are eliminated in accordance with the present invention.

As previously mentioned, when the input timing requirement of input data register circuit 318 of FIG. 3A is satisfied, it outputs a digital data signal 313 that reflects digital data signal 312. Internal functional circuitry 320 is coupled to receive digital data signal 313 from input data register circuit 318. Furthermore, internal functional circuitry 320 is also coupled to receive clock signal 324 from clock generator circuit 316. Internal functional circuitry 320 utilizes clock signal 324 and digital data signal 313 for a variety of purposes related to the functional operations of digital receiver device 304.

Figure 4:
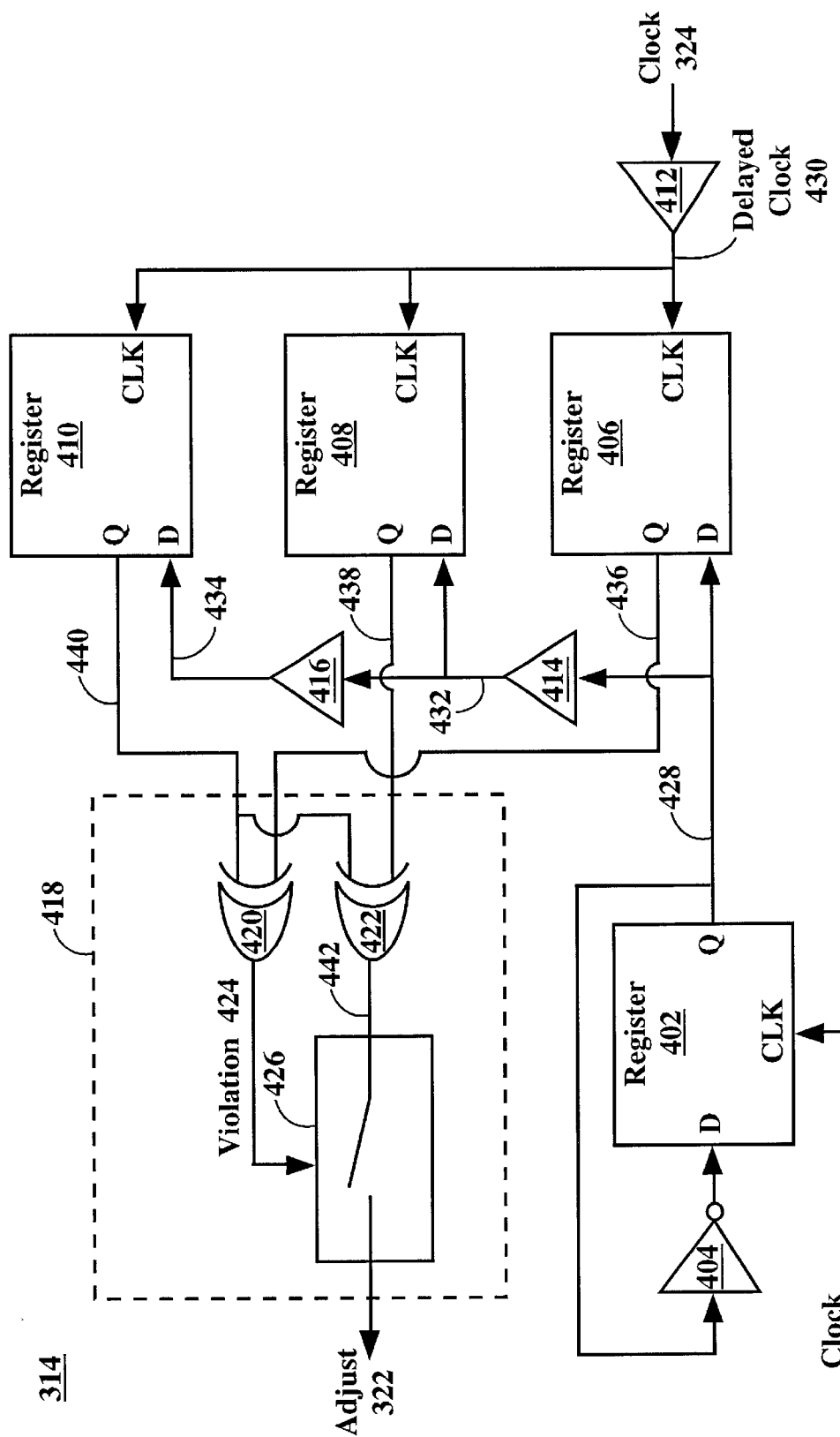
FIG. 4 is a block diagram of one embodiment of clock monitor circuit of FIG. 3A in accordance with the present invention, which is utilized for detecting potential input timing violations of the input data register circuit and then initiating a process to eliminate them.

FIG. 4 is a block diagram of one embodiment of clock monitor circuit 314 of FIG. 3A in accordance with the present invention, which is utilized for detecting potential input timing violations of input data register circuit 318 and then initiating a process to eliminate them. In order to more fully understand clock monitor circuit 314, it should be appreciated that typically timing detection is performed when signals are changing their state. Since digital data signal 312 of FIG. 3A cannot be relied upon for changing its state, an artificial data signal 428 is generated within clock monitor circuit 314 having the same timing as digital data signal 312.

Data register circuits 406–410 of FIG. 4 are collectively utilized to detect any potential input timing violations of input data register circuit 318 by sampling several time-shifted variants of artificial data signal 428. For instance, with reference to FIG. 3B, data register circuit 406 is utilized to detect potential violations of the hold time criterion 354 of all rising clock transitions within clock signal 324. Furthermore, data register circuit 410 is utilized to detect potential violations of the set-up time criterion 352 of all rising clock transitions within clock signal 324. Moreover, data register circuit 408 is utilized to sample the nominal value of artificial data signal 428 in the same fashion as input data register circuit 318 would sample digital data signal 312. In this manner, clock monitor circuit 314 is able to detect the occurrence of any potential input timing violations of stability window 356.

A control unit 418 of FIG. 4 is coupled to the Q outputs of data register circuits 406–410 in order to determine whether a potential input timing violation has occurred. If a timing violation is detected, control unit 418 transmits an adjust signal 322 directing clock generator circuit 316 of FIG. 3A to shift the phase of clock signal 324 forward or backward with respect to clock signal 310. In this manner the potential timing violation is corrected in accordance with the present invention. It should be appreciated that one embodiment of control unit 418, in accordance with the present invention, is implemented using software.

Clock monitor circuit 314 of FIG. 4 utilizes a dummy register circuit 402 to receive clock signal 310. Within the present embodiment, the physical parameters of dummy register circuit 402 very closely match the physical parameters of output data register circuit 308 of FIG. 3A. In other words, dummy register circuit 402 and output data register circuit 308 have the same electrical characteristics. In this manner, dummy register circuit 402 is able to more closely model the operation of output register circuit 308. As shown in FIG. 4, dummy register circuit 402 samples the inverse of its Q output. As such, dummy register circuit 402 outputs an artificial data signal 428 which is received by an invertor circuit 404, which outputs the inverse value of artificial data signal 428. Therefore, every time dummy register circuit 402 encounters an active clock transition within clock signal 310, it changes its state. Since dummy register circuit 402 has two states within the present embodiment, it toggles between the value of 1 and 0 on every rising edge of clock signal 310. By generating artificial data signal 428 in this fashion, it has many transitions thereby enabling data register circuits 406–410 to better detect any potential input timing violations for input data register circuit 318.

Clock monitor circuit 314 of FIG. 4 utilizes a delay circuit 412 to receive clock signal 324. It should be appreciated that delay circuit 412 delays clock signal 324 with a time equal to one unit of the hold time of a clock transition of clock signal 324. Delay circuit 412 outputs a delayed clock signal 430, which is received by data register circuits 406–410. It should be appreciated that within the present embodiment each of data register circuits 406–410 has the same electrical characteristics as input data register circuit 318 of FIG. 3A. In this manner, data register circuits 406–410 are able to more closely model the operation of input data register circuit 318. It should be further appreciated that within the present embodiment each of data register circuits 406–410 are more resistant against violations of their input timing because some of them may temporarily operate under bad timing conditions.

Data register circuit 406 of FIG. 4 is coupled to receive artificial data signal 428 which is generated by dummy register circuit 402. As previously mentioned, data register circuit 406 is utilized to detect potential violations of the hold time criterion 354 of all rising clock transitions within clock signal 324. To this end, data register circuit 406 generates an output signal 436 at its Q output having a data value reflecting the data value present at its D input during the clock transitions within delayed clock signal 430. An exclusive OR (XOR) gate 420, located within control unit 418, is coupled to receive output signal 436 from data register circuit 406.

A delay circuit 414 of FIG. 4 is coupled to receive artificial data signal 428 which is generated by dummy register circuit 402. It should be appreciated that delay circuit 414 delays artificial data signal 428 with a time equal to one unit of the hold time of a clock transition within clock signal 324. Delay circuit 414 outputs a delayed artificial data signal 432 which is received by data register circuit 408. In order to ensure proper operation of clock monitor circuit 314, it should be appreciated that each of delay circuits 412–416 should provide a delay time that is no less than the time it is modeling (e.g., the set-up time or the hold time).

Data register circuit 408 of FIG. 4 is coupled to receive delayed artificial data signal 432 which is output by delay circuit 414. As previously mentioned, data register circuit 408 is utilized to sample the nominal data value of artificial data signal 428 in the same fashion as input data register circuit 318 would sample digital data signal 312. To this end, data register circuit 408 generates an output signal 438 at its Q output having a data value reflecting the data value present at its D input during the clock transitions within delayed clock signal 430. An XOR gate 422, which is located within control unit 418, is coupled to receive output signal 438 from data register circuit 408.

A delay circuit 416 of FIG. 4 is coupled to receive delayed artificial data signal 432, which is output by delay circuit 414. It should be appreciated that delay circuit 416 provides a delay to delayed artificial data signal 432 with a time equal to one unit of the set-up time of a clock transition within clock signal 324. Delay circuit 416 outputs a twice delayed artificial data signal 434 which is received by data register circuit 410.

Data register circuit 410 of FIG. 4 is coupled to receive twice delayed artificial data signal 434 which is output by delay circuit 416. As previously mentioned, data register circuit 410 is utilized to detect potential violations of the set-up time criterion 352 of all rising clock transitions within clock signal 324. To this end, data register circuit 410 generates an output signal 440 at its Q output having a data value reflecting the data value present at its D input during the clock transitions of delayed clock signal 430. XOR gates 420 and 422 are both coupled to receive output signal 440 from data register circuit 410.

It should be appreciated that clock monitor circuit 314 of FIG. 4 operates in a manner such that if the input timing requirement of input register circuit 318 is satisfied, each of the Q outputs of data register circuits 406–410 yields the same output signal that reflects artificial data signal 428. Should the stability window be violated, one of data register circuits 406–410 yields a different result from the others. As such, XOR gate 420 outputs a violation signal 424 causing a switch 426 to close. When switch 426 closes, it enables XOR gate 422 to output a direction signal 442 to switch 426. Direction signal 442 is subsequently utilized by switch 426 to produce adjust signal 322 which directs clock generator 316 of FIG. 3A to shift the phase of clock signal 324 in a particular direction (e.g., forward or backward) with respect to clock signal 310 in order to correct the potential timing violation.

It should be appreciated that adjust signal 322, which is output by switch 426, is a tri-state output signal. For example, if no potential input timing violations are detected by clock monitor circuit 314, switch 426 remains open and adjust signal 322 has a voltage value that indicates to clock generator circuit 316 that there is no need to shift the phase of clock signal 324. Furthermore, if a potential input timing violation is detected, switch 426 closes thereby enabling it to receive direction signal 442 from XOR gate 422. Switch 426 utilizes direction signal 442 to produce the other two states of adjust signal 322, thereby causing clock generator circuit 316 to receive a voltage value (e.g., high or low voltage) indicating the particular direction it should shift the phase of clock signal 324. A tri-state output signal such as adjust signal 322 is helpful not only for detecting the need for a phase adjustment of clock signal 324, but is also a fast way to inform clock generator circuit 316 of the proper direction to correct any potential input timing violations.

Within the present embodiments of FIGS. 3A and 4, it should be appreciated that dummy register circuit 402, data registers circuit 406–410, input data register circuit 318, and output data register circuit 308 all change their state on the rising edge of each clock transition within clock signal 310 and that each are implemented as clocked D flip-flop circuits. However, it should be appreciated that the present invention is well suited to an embodiment of dummy register circuit 402, data registers circuit 406–410, input data register circuit 318, and output data register circuit 308 each changing their state in any particular manner. Furthermore, it should be appreciated that the present invention is well suited to an embodiment of dummy register circuit 402, data registers circuit 406–410, input data register circuit 318, and output data register circuit 308 each implemented with any type of circuitry.

Figure 5:
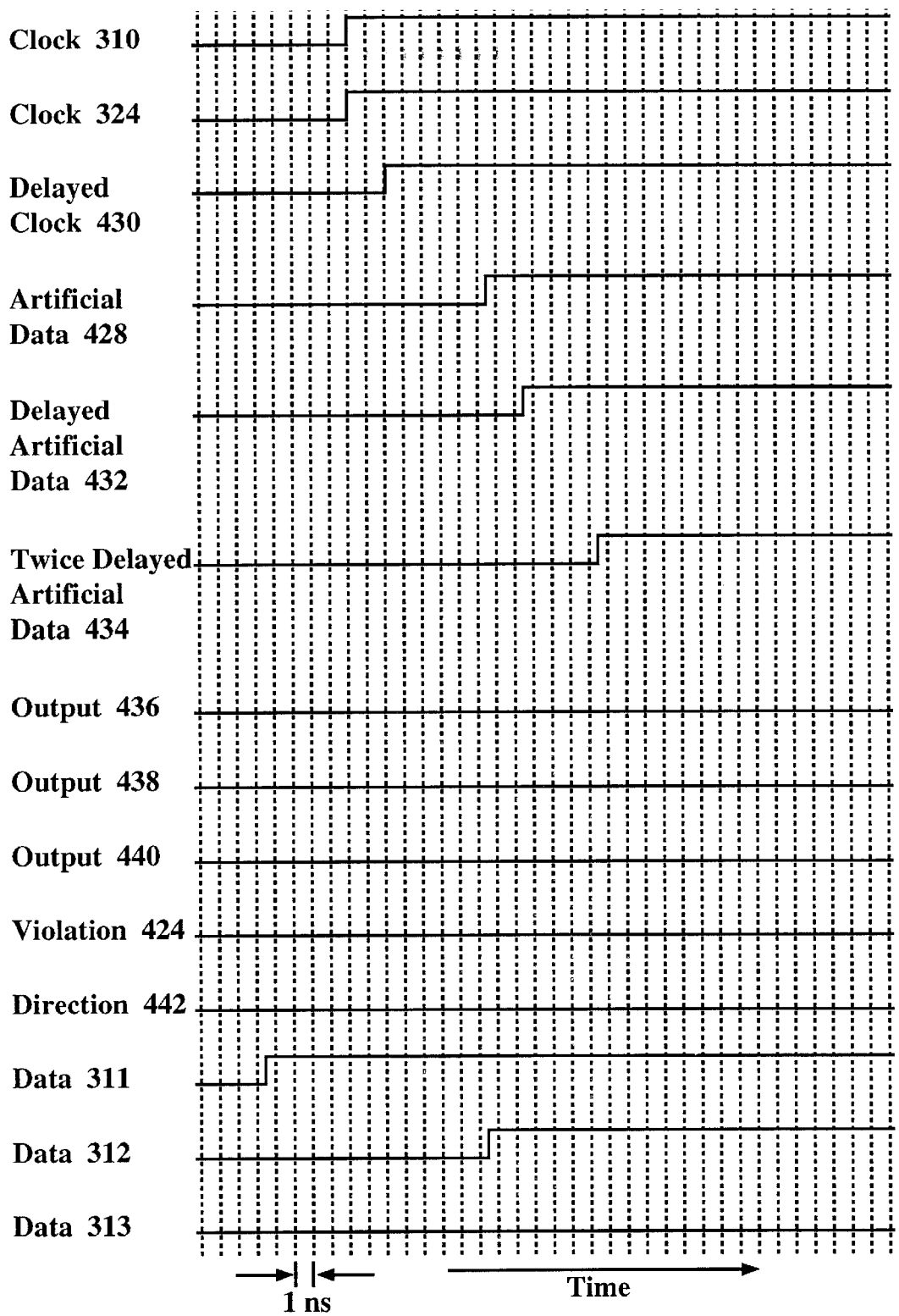
FIG. 5 is a timing diagram illustrating the operation of the digital transmission and reception system of FIG. 3A and the clock monitor circuit of FIG. 4 when the generated clock signal within the digital receiver device is synchronized with the clock signal received from the digital transmitter device.

FIG. 5 is a timing diagram illustrating the operation of digital transmission and reception system 300 of FIG. 3A and clock monitor circuit 314 of FIG. 4 when clock signal 324 is synchronized with clock signal 310. It should be appreciated that the timing conditions of input data register circuit 318 are satisfied. As such, input data register circuit 318 outputs a valid digital data signal 313 in this situation.

Figure 6:
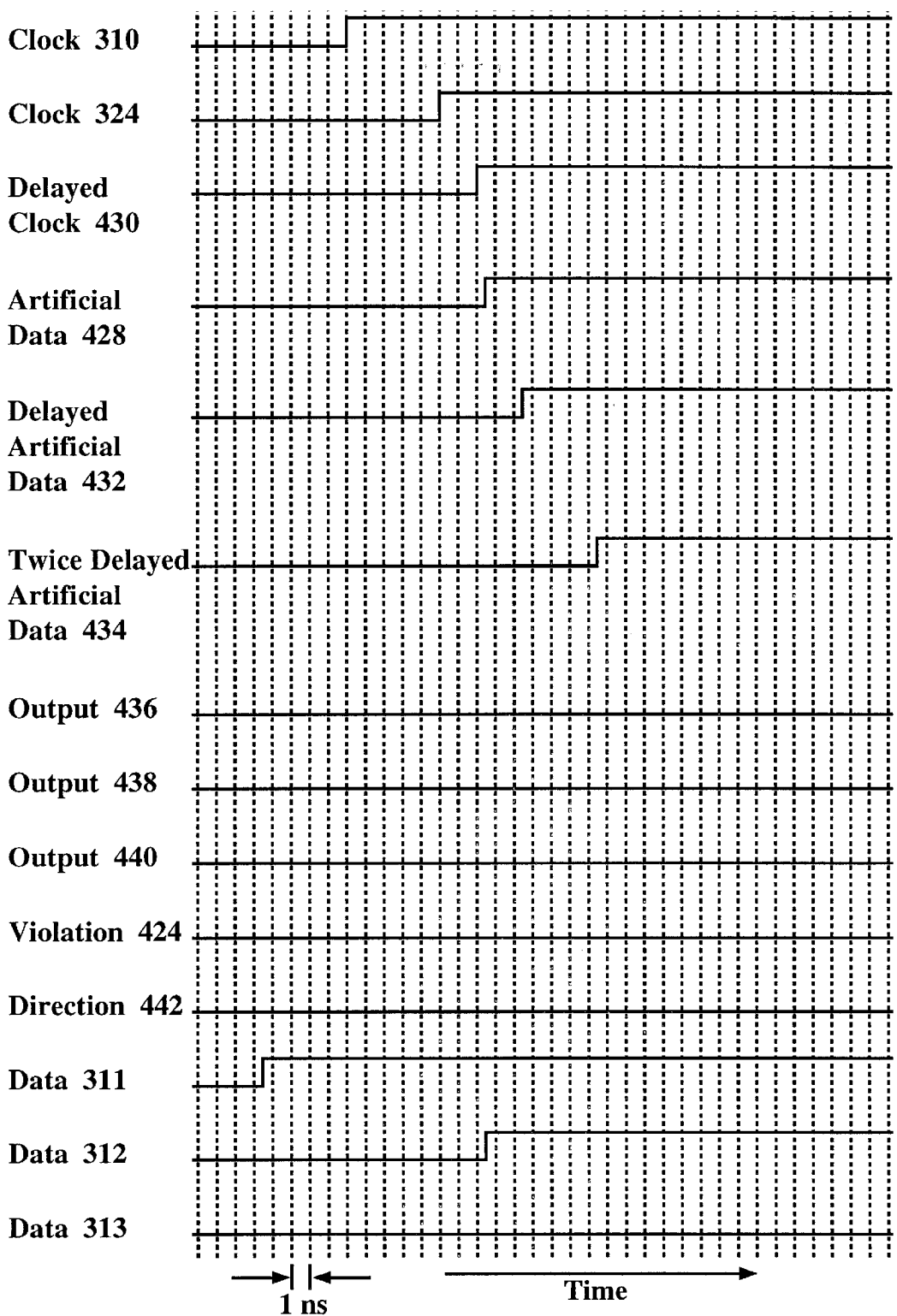
FIG. 6 is a timing diagram illustrating the operation of the digital transmission and reception system of FIG. 3A and clock monitor circuit of FIG. 4 when the generated clock signal within the digital receiver device lags the clock signal received from the digital transmitter device by 5 nanoseconds (ns).

FIG. 6 is a timing diagram illustrating the operation of digital transmission and reception system 300 of FIG. 3A and clock monitor circuit 314 of FIG. 4 when clock signal 324 lags clock signal 310 by 5 nanoseconds (ns). It should be appreciated that the timing conditions of input data register circuit 318 are satisfied. As such, input data register circuit 318 outputs a valid digital data signal 313 in this situation.

Figure 7:
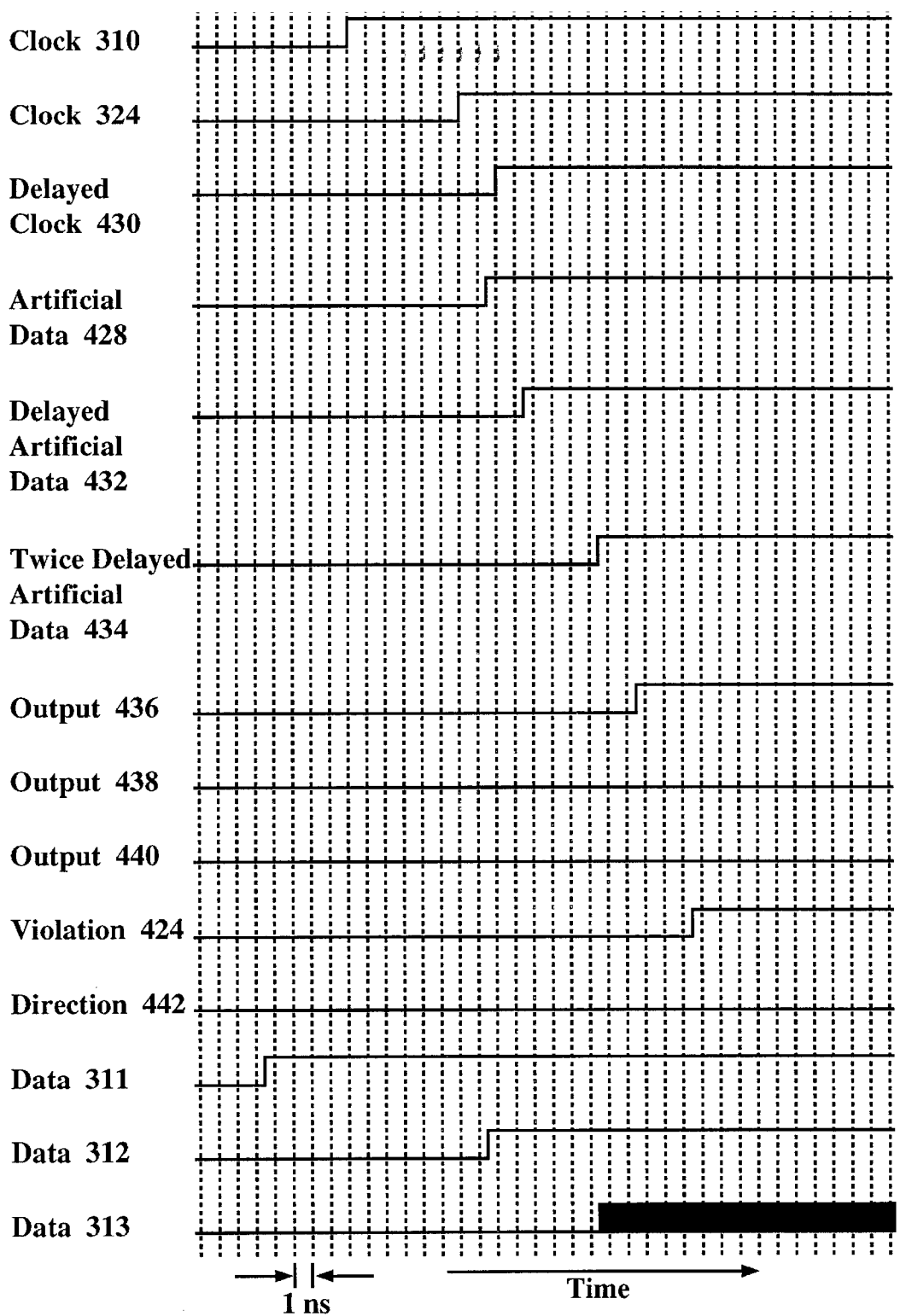
FIG. 7 is a timing diagram illustrating the operation of the digital transmission and reception system of FIG. 3A and clock monitor circuit of FIG. 4 when the generated clock signal within the digital receiver device lags the clock signal received from the digital transmitter device by 6 ns.

FIG. 7 is a timing diagram illustrating the operation of digital transmission and reception system 300 of FIG. 3A and clock monitor circuit 314 of FIG. 4 when clock signal 324 lags clock signal 310 by 6 ns. It should be appreciated that the rising transition of delayed clock signal 430 has intruded within the stability window between the rising transitions of artificial data signal 428 and twice delayed artificial data signal 434. As such, an input hold time violation is detected which would cause digital data signal 313, which is output by input data register circuit 318, to be invalid in this situation. Therefore, direction signal 442 remains at a low voltage suggesting a forward adjustment of clock signal 324 by clock monitor 314.

Figure 8:
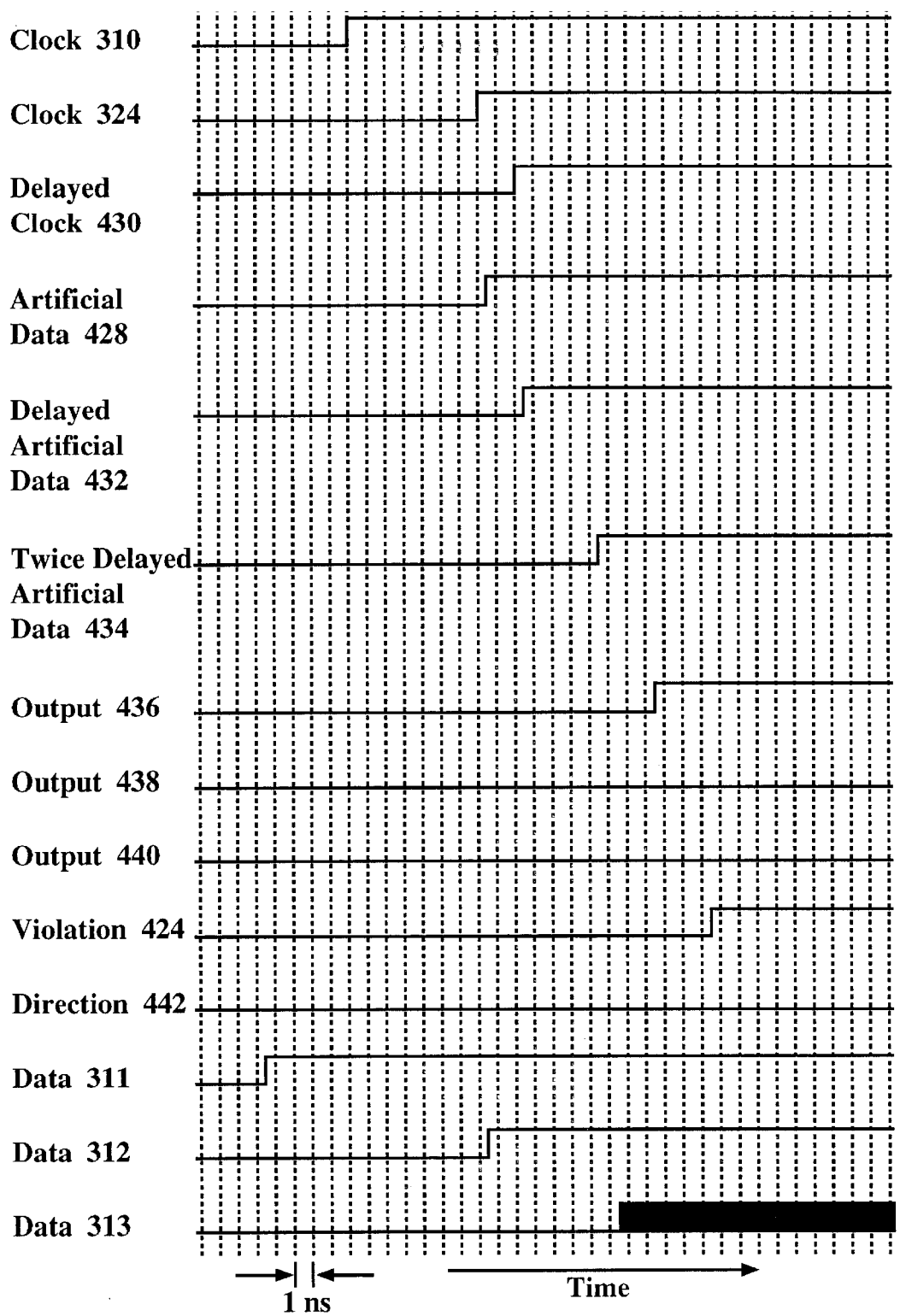
FIG. 8 is a timing diagram illustrating the operation of the digital transmission and reception system of FIG. 3A and clock monitor circuit of FIG. 4 when the generated clock signal within the digital receiver device lags the clock signal received from the digital transmitter device by 7 ns.

FIG. 8 is a timing diagram illustrating the operation of digital transmission and reception system 300 of FIG. 3A and clock monitor circuit 314 of FIG. 4 when clock signal 324 lags clock signal 310 by 7 ns. It should be appreciated that the rising transition of delayed clock signal 430 has intruded within the stability window between the rising transitions of artificial data signal 428 and twice delayed artificial data signal 434. As such, an input hold time violation is detected which would cause digital data signal 313, which is output by input data register circuit 318, to be invalid in this situation. Therefore, direction signal 442 remains at a low voltage suggesting a forward adjustment of clock signal 324 by clock monitor 314.

Figure 9:
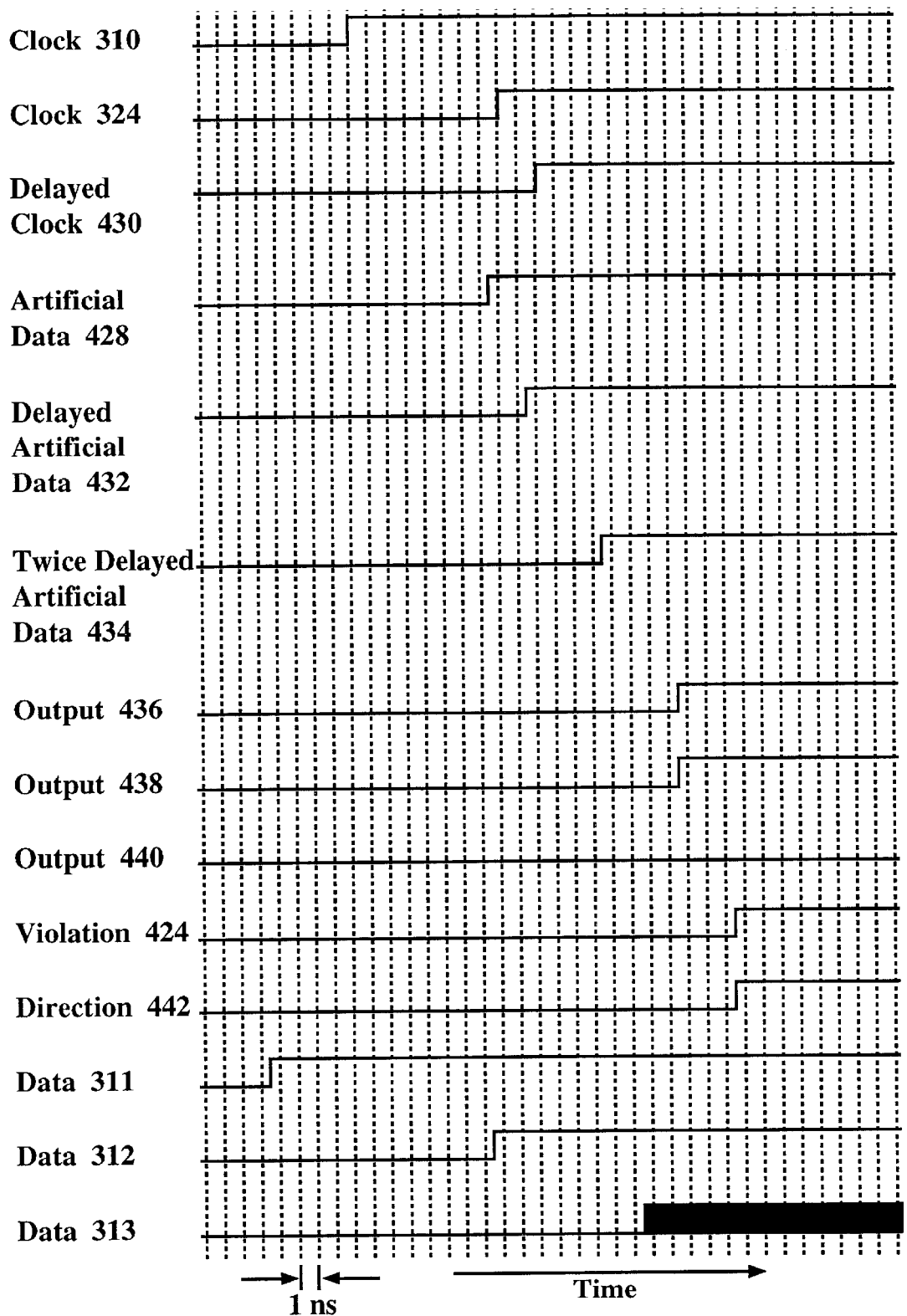
FIG. 9 is a timing diagram illustrating the operation of the digital transmission and reception system of FIG. 3A and clock monitor circuit of FIG. 4 when the generated clock signal within the digital receiver device lags the clock signal received from the digital transmitter device by 8 ns.

FIG. 9 is a timing diagram illustrating the operation of digital transmission and reception system 300 of FIG. 3A and clock monitor circuit 314 of FIG. 4 when clock signal 324 lags clock signal 310 by 8 ns. It should be appreciated that the rising transition of delayed clock signal 430 has intruded within the stability window between the rising transitions of artificial data signal 428 and twice delayed artificial data signal 434. As such, an input set-up time violation is detected which would cause digital data signal 313, which is output by input data register circuit 318, to be invalid in this situation. Therefore, direction signal 442 transitions to a high voltage suggesting a backward adjustment of clock signal 324 by clock monitor 314.

Figure 10:
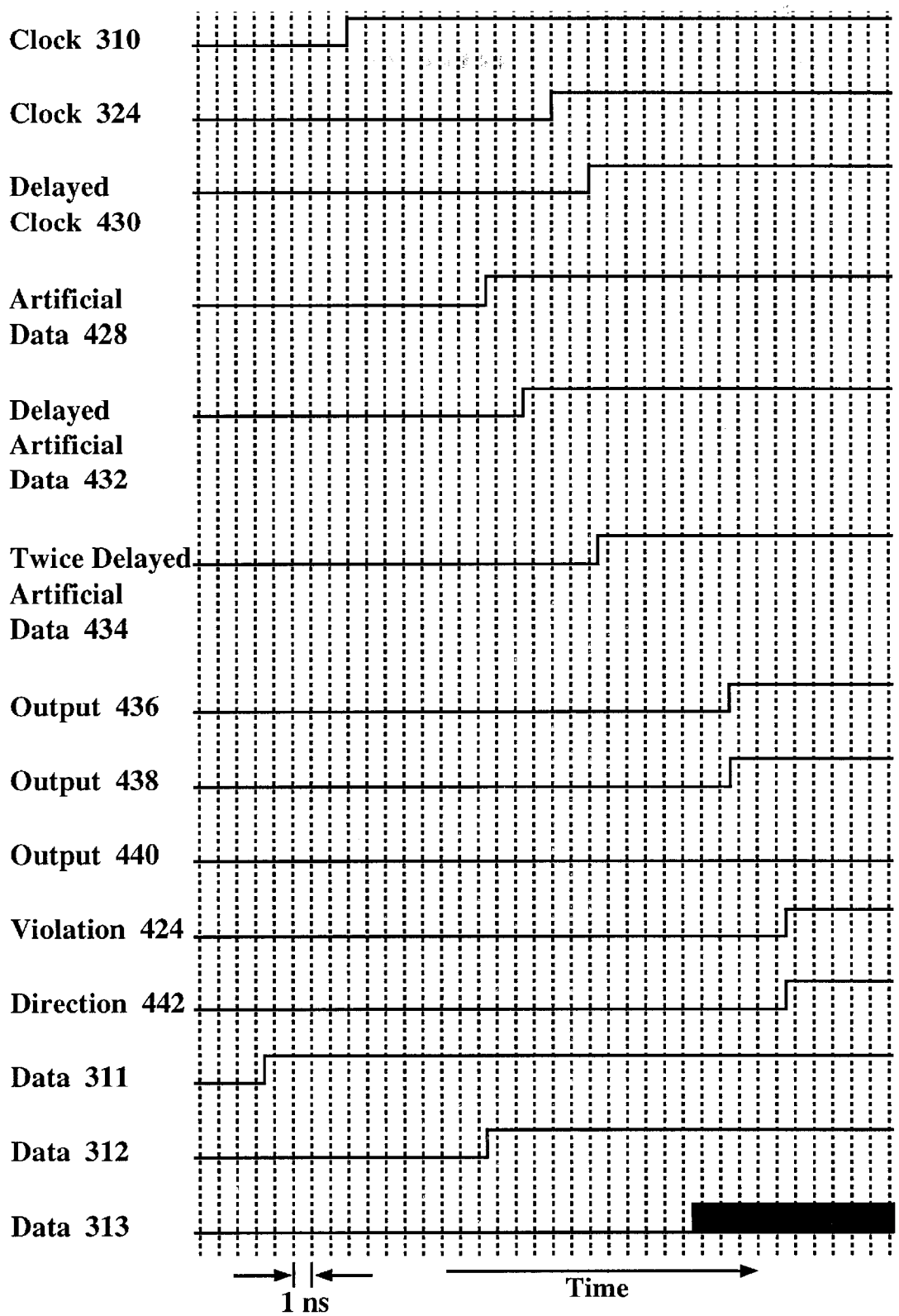
FIG. 10 is a timing diagram illustrating the operation of the digital transmission and reception system of FIG. 3A and clock monitor circuit of FIG. 4 when the generated clock signal within the digital receiver device lags the clock signal received from the digital transmitter device by 11 ns.

FIG. 10 is a timing diagram illustrating the operation of digital transmission and reception system 300 of FIG. 3A and clock monitor circuit 314 of FIG. 4 when clock signal 324 lags clock signal 310 by 11 ns. It should be appreciated that the rising transition of delayed clock signal 430 has intruded within the stability window between the rising transitions of artificial data signal 428 and twice delayed artificial data signal 434. As such, an input set-up time violation is detected which would cause digital data signal 313, which is output by input data register circuit 318, to be invalid in this situation. Therefore, direction signal 442 transitions to a high voltage suggesting a backward adjustment of clock signal 324 by clock monitor 314.

Figure 11:
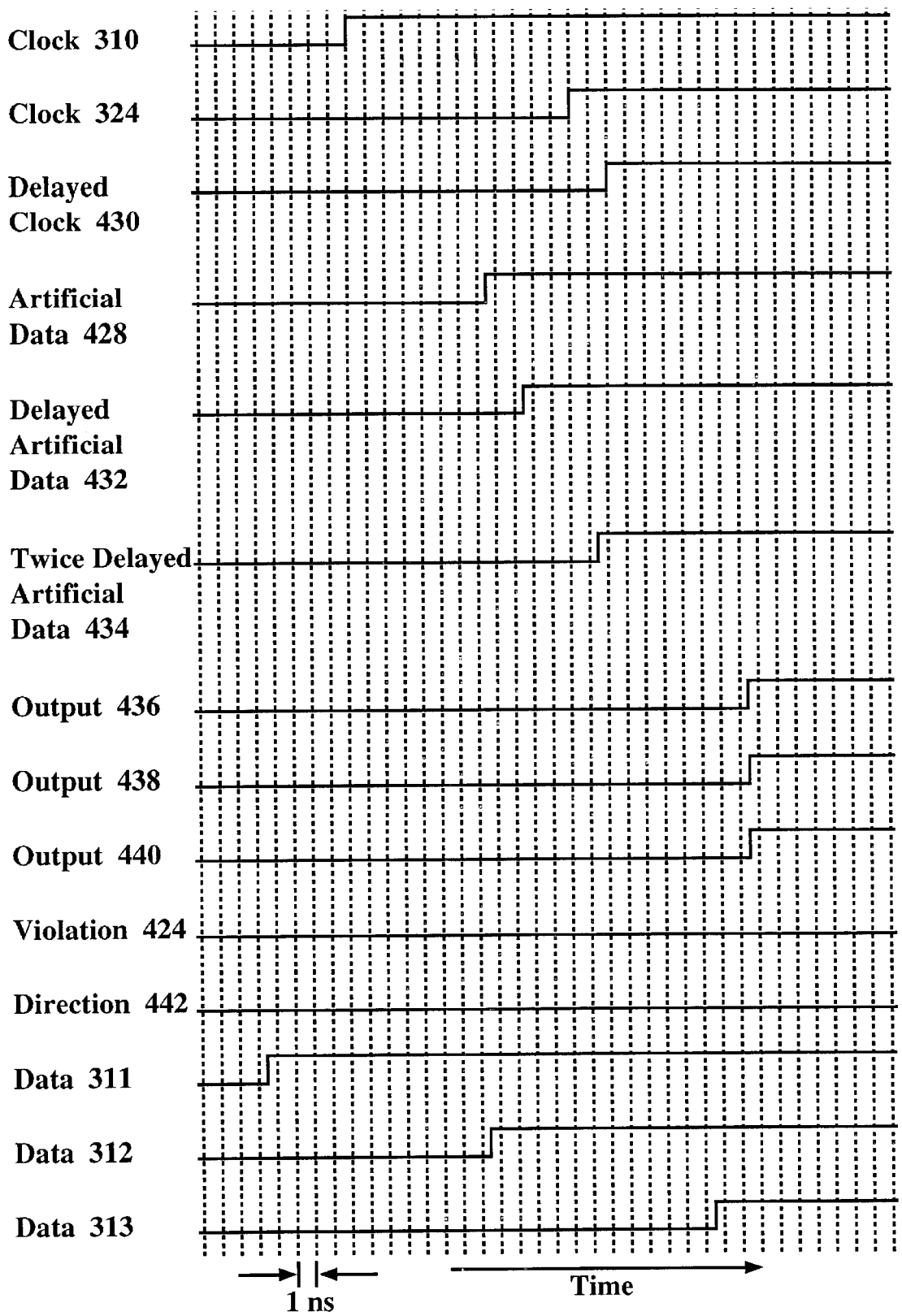
FIG. 11 is a timing diagram illustrating the operation of the digital transmission and reception system of FIG. 3A and clock monitor circuit of FIG. 4 when the generated clock signal within the digital receiver device lags the clock signal received from the digital transmitter device by 12 ns.

FIG. 11 is a timing diagram illustrating the operation of digital transmission and reception system 300 of FIG. 3A and clock monitor circuit 314 of FIG. 4 when clock signal 324 lags clock signal 310 by 12 ns. It should be appreciated that the timing conditions of input data register circuit 318 are satisfied. As such, input data register circuit 318 outputs a valid digital data signal 313 in this situation.

Figure 12:
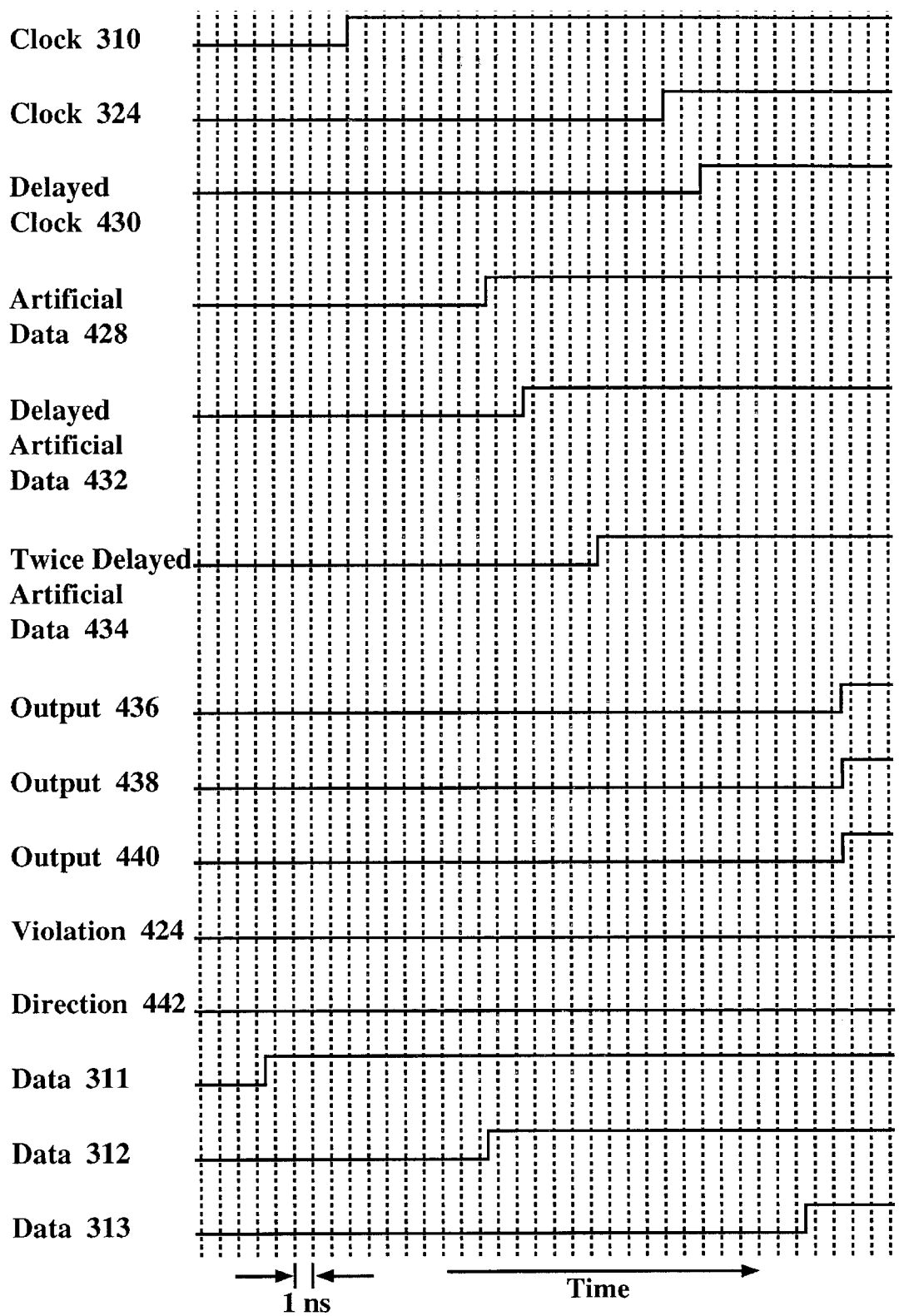
FIG. 12 is a timing diagram illustrating the operation of the digital transmission and reception system of FIG. 3A and clock monitor circuit of FIG. 4 when the generated clock signal within the digital receiver device lags the clock signal received from the digital transmitter device by 17 ns.

FIG. 12 is a timing diagram illustrating the operation of digital transmission and reception system 300 of FIG. 3A and clock monitor circuit 314 of FIG. 4 when clock signal 324 lags clock signal 310 by 17 ns. It should be appreciated that the timing conditions of input data register circuit 318 are satisfied. As such, input data register circuit 318 outputs a valid digital data signal 313 in this situation.

Figure 13A:
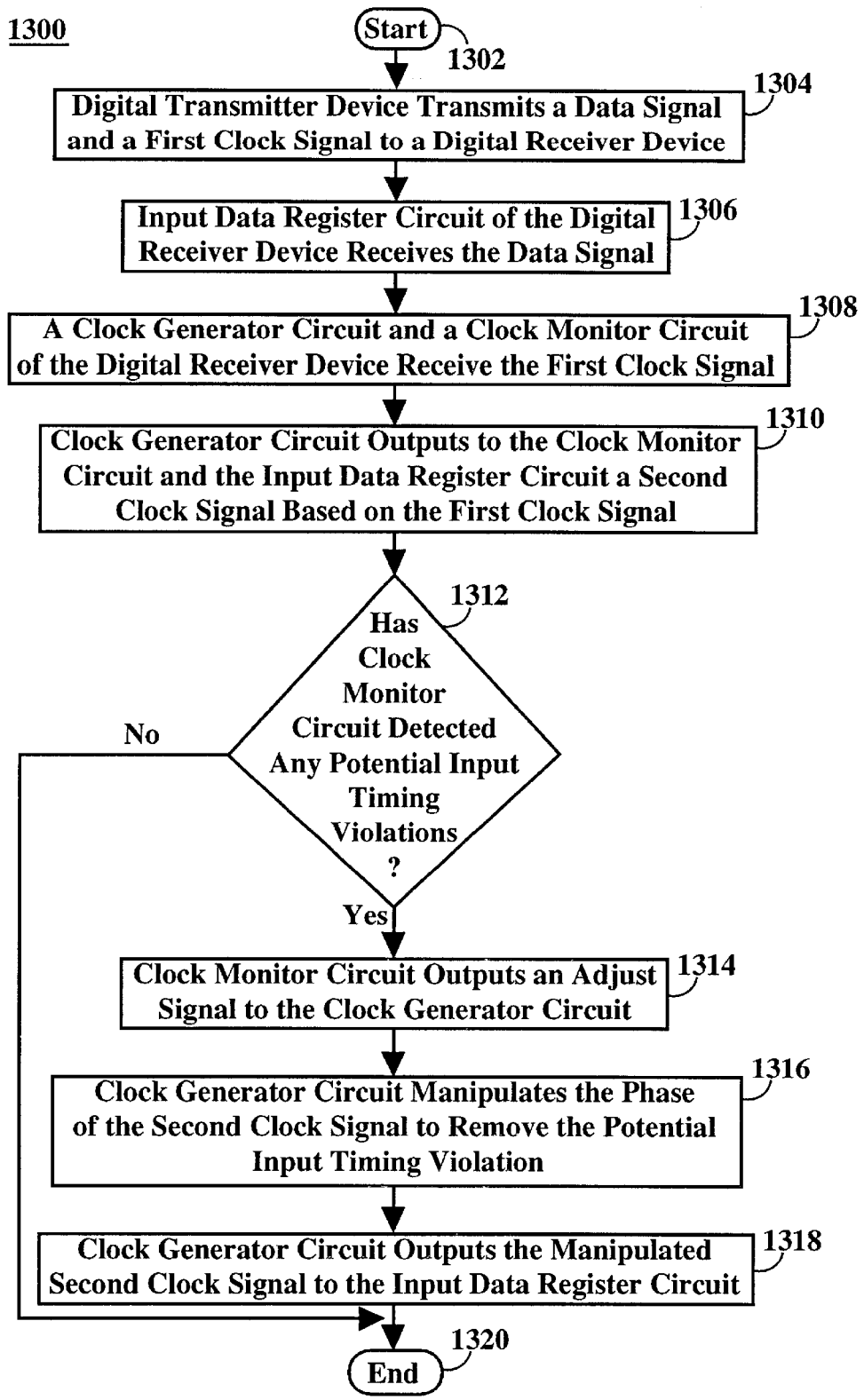
FIG. 13A is a flowchart of a method in accordance with one embodiment of the present invention for avoiding unstable data transfer between digital systems.

FIG. 13A is a flowchart of a method 1300 in accordance with one embodiment of the present invention for avoiding unstable data transfer between digital systems. Process 1300 starts at step 1302 and proceeds to step 1304. Within step 1304, a digital transmitter device transmits a data signal and a first clock signal to a digital receiver device.

During step 1306 of FIG. 13A, an input data register circuit of the digital receiver device receives the data signal from the digital transmitter device.

Within step 1308 of FIG. 13A, a clock generator circuit and a clock monitor circuit of the digital receiver device receive the first clock signal from the digital transmitter device.

During step 1310 of FIG. 13A, the clock generator circuit outputs to both the clock monitor circuit and the input data register circuit a second clock signal derived from the first clock signal.

Within step 1312 of FIG. 13A, the clock monitor circuit determines if there are any potential input timing violations for the input data register circuit. During step 1312, if the clock monitor circuit does not detect any potential input timing violations, process 1300 proceeds to step 1320. If the clock monitor detects any potential input timing violations during step 1312, process 1300 proceeds to step 1314.

During step 1314 of FIG. 13A, the clock monitor circuit outputs an adjust signal to the clock generator circuit.

Within step 1316 of FIG. 13A, the received adjust signal directs the clock generator circuit to manipulate the phase of the second clock signal with respect to the phase of the first clock signal in order to remove the potential input timing violation.

During step 1318 of FIG. 13A, the clock generator circuit outputs the manipulated second clock signal to the input data register circuit.

Process 1300 of FIG. 13A is then exited during step 1320.

Figure 13B:
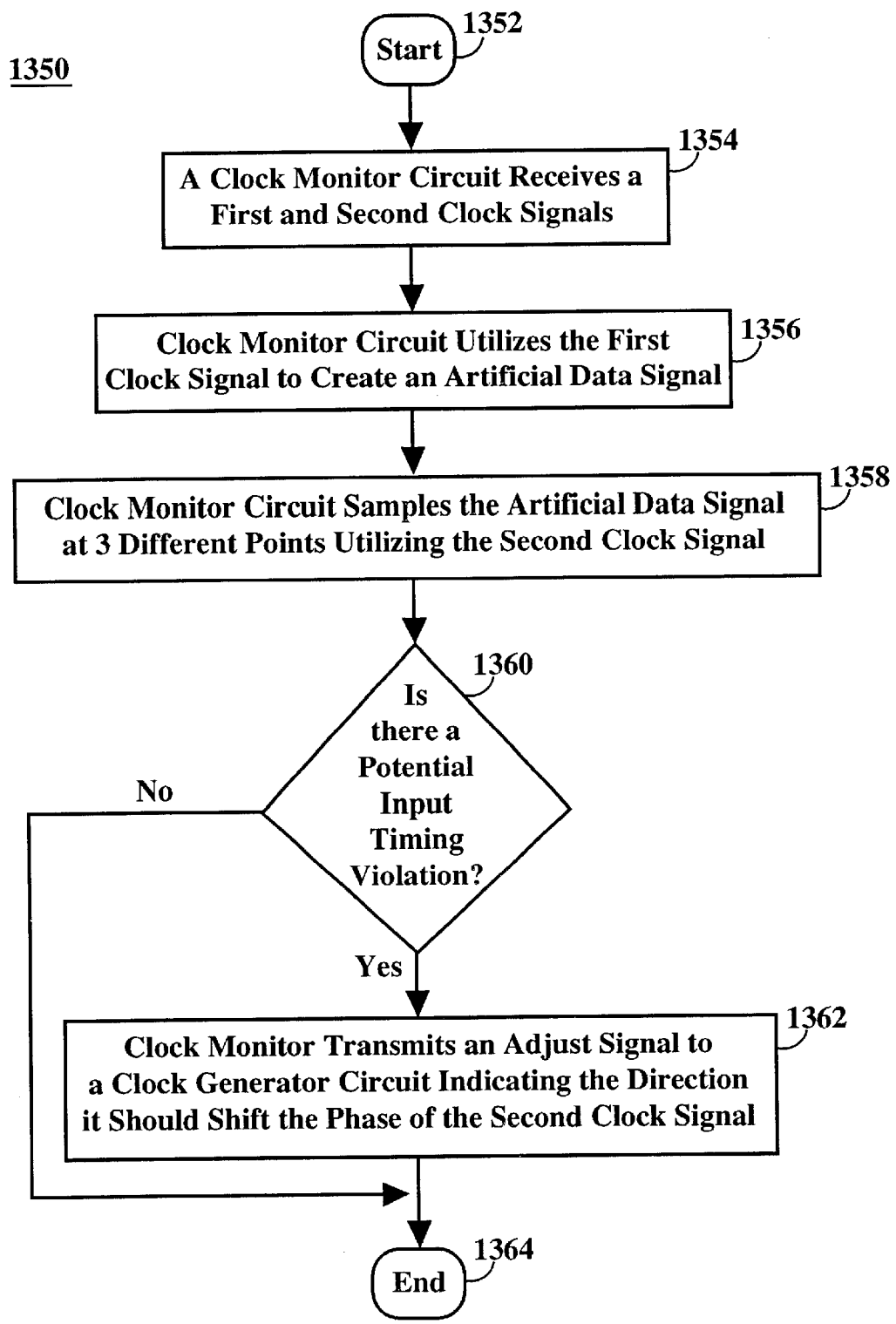
FIG. 13B is a flowchart of a method in accordance with one embodiment of the present invention for enabling the clock monitor circuit of FIG. 13A to detect any potential input timing violations of the input data register circuit and direct the clock generator circuit in the manner to correct them.

FIG. 13B is a flowchart of a method 1350 in accordance with one embodiment of the present invention for enabling the clock monitor circuit of FIG. 13A to detect any potential input timing violations of the input data register circuit and direct the clock generator circuit in a manner to correct them. Process 1350 starts at step 1352 and proceeds to step 1354. Within step 1354, a clock monitor circuit receives a first and second clock signals in the manner described above (e.g., in the discussions of FIGS. 3A, 3B, 4, and 13A).

During step 1356 of FIG. 13B, the clock monitor circuit utilizes the first clock signal in order to generate an artificial data signal in the manner described above.

Within step 1358 of FIG. 13B, the clock monitor circuit samples the artificial data signal at three different points in time utilizing the second clock signal, as described above.

During step 1360 of FIG. 13B, the clock monitor circuit analyzes the three samples of artificial data signal in order to determine if there is a potential input violation of the input data register circuit. As described above, during step 1360, if the clock monitor circuit does not detect any potential input timing violations, process 1350 proceeds to step 1364. If the clock monitor circuit detects any potential input timing violations during step 1360, process 1350 proceeds to step 1362.

During step 1362 of FIG. 13B, the clock monitor circuit transmits an adjust signal to the clock generator circuit indicating the direction it should shift the phase of the second clock signal, as described above. For example, one embodiment of the adjust signal has a high voltage value indicating that the phase of the second clock signal should be shifted backward with respect to the first clock signal. Furthermore, a low voltage value adjust signal indicates that the phase should be shifted forward with respect to the first clock signal.

Process 1350 of FIG. 13B is then exited during step 1364. It should be appreciated that another embodiment of process 1350 could continue until the completion of the data transmission between the digital transmission device and the digital receiver device.

Thus, the present invention provides a system which enables a digital transmitter device and a digital receiver device to communicate while avoiding unstable data transfer, which can result in a loss of data or signal distortion.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for avoiding unstable data transfer between digital devices, said system comprising:
   a digital transmitter device which transmits a data signal and a first clock signal; and
   a digital receiver device coupled to receive said data signal and said first clock signal, said digital receiver device comprising:
   a clock generator circuit coupled to receive said first clock signal and for generating a second clock signal;
   a clock monitor circuit coupled to receive said first clock signal and said second clock signal, wherein said clock monitor circuit detects a potential unstable operating condition for said digital receiver device by monitoring the set-up time criterion and the hold time criterion of the transitions within said second clock signal;
   in response to detecting said potential unstable operating condition, said clock monitor circuit generates an adjust signal causing said clock generator circuit to manipulate the phase of said second clock signal with respect to the phase of said first clock signal in order to remove said potential unstable operating condition; and
   internal circuitry coupled to receive said data signal and said second clock signal.

2. The system as described in claim 1 wherein said clock generator circuit manipulates the phase of said second clock signal by shifting it backward or forward with respect to the phase of said first clock signal.

3. The system as described in claim 1 wherein said potential unstable operating condition is a potential input timing violation for said digital receiver device.

4. The system as described in claim 1 wherein said internal circuitry comprises a register coupled to receive said data signal and said second clock signal.

5. The system as described in claim 1 wherein said clock monitor circuit detects said potential unstable operating condition for said digital receiver device utilizing an artificial data signal having similar timing as said first clock signal.

6. The system as described in claim 1 wherein said clock monitor circuit detects said potential unstable operating condition for said digital receiver device utilizing a plurality of registers.

7. The system as described in claim 1 wherein said clock monitor circuit detects said potential unstable operating condition for said digital receiver device utilizing a control unit.

8. The system as described in claim 7 wherein said control unit is implemented using hardware or software.

9. The system as described in claim 1 wherein said digital transmitter device and said digital receiver device are located on a common circuit board.

10. The system as described in claim 1 wherein said digital transmitter device and said digital receiver device are each separate digital devices.

11. A system for avoiding unstable data transfer between digital devices, said system comprising:
   a digital transmitter device which transmits a data signal and a first clock signal; and
   a digital receiver device coupled to receive said data signal and said first clock signal, said digital receiver device comprising:
      a clock generator circuit coupled to receive said first clock signal and for generating a second clock signal based on said first clock signal;
      a clock monitor circuit coupled to receive said first clock signal and said second clock signal, wherein said clock monitor circuit detects a potential input timing violation for said digital receiver device by monitoring the set-up time criterion and the hold time criterion of the transitions within said second clock signal;
      in response to detecting said potential input timing violation, said clock monitor circuit generates an adjust signal causing said clock generator circuit to shift the phase of said second clock signal with respect to the phase of said first clock signal by temporarily increasing or decreasing the frequency of said second clock signal in order to remove said potential input timing violation; and
      internal circuitry coupled to receive said data signal and said second clock signal.

12. The system as described in claim 11 wherein said digital transmitter device and said digital receiver device are located on a common circuit board.

13. The system as described in claim 11 wherein said digital transmitter device and said digital receiver device are each separate digital devices.

14. The system as described in claim 11 herein said internal circuitry comprises a flip-flop circuit coupled to receive said data signal and said second clock signal.

15. The system as described in claim 11 herein said clock monitor circuit detects said potential input timing violation for said digital receiver device utilizing an artificial data signal having similar timing as said first clock signal.

16. The system as described in claim 11 wherein said clock monitor circuit detects said potential input timing violation for said digital receiver device utilizing a plurality of registers.

17. The system as described in claim 11 wherein said clock monitor circuit detects said potential input timing violation for said digital receiver device utilizing a control unit.

18. The system as described in claim 17 herein said control unit is implemented using hardware or software.

19. A method for avoiding unstable data transfer between digital devices, said method comprising:
   transmitting a data signal and a first clock signal using a digital transmitter device;
   receiving said data signal and said first clock signal using a digital receiver device;
   generating a second clock signal based on said first clock signal using a clock generator circuit which is part of said digital receiver device;
   receiving said first clock signal and said second clock signal using a clock monitor circuit which is part of said digital receiver device;
   detecting a potential unstable operating condition for said digital receiver device by monitoring the set-up time criterion and the hold time criterion of the transitions within said second clock signal using said clock monitor circuit;
   generating an adjust signal in response to said potential unstable operating condition, wherein said adjust signal causes said clock generator circuit to manipulate the phase of said second clock signal with respect to the phase of said first clock signal in order to remove said potential unstable operating condition, said adjust signal generated by said clock monitor circuit; and
   receiving said data signal and said second clock signal using internal circuitry of said digital receiver device.

20. The method as described in claim 19 wherein said clock generator circuit manipulates the phase of said second clock signal by shifting it backward or forward with respect to the phase of said first clock signal.

21. The method as described in claim 20 wherein said clock monitor circuit detects said potential unstable operating condition for said digital receiver device utilizing an artificial data signal having similar timing as said first clock signal.

22. The method as described in claim 19 wherein said internal circuitry comprises a register circuit.

23. The method as described in claim 19 wherein said potential unstable operating condition is a potential input timing violation for said digital receiver device.

24. The method as described in claim 19 wherein said clock monitor circuit detects said potential unstable operating condition for said digital receiver device utilizing a plurality of registers.

25. The method as described in claim 19 wherein said clock monitor circuit detects said potential unstable operating condition for said digital receiver device utilizing a control unit.

26. The method as described in claim 25 wherein said control unit is implemented using hardware or software.

* * * * *